INVENTOR.
RICHARD H. MERRICK
BY  RICHARD A. ENGLISH

ATTORNEY.

June 12, 1962  R. A. ENGLISH ETAL  3,038,320
ABSORPTION REFRIGERATION SYSTEM
Filed July 7, 1958  2 Sheets-Sheet 2

INVENTORS
RICHARD H. MERRICK
RICHARD A. ENGLISH
BY
*Herman Seid*
ATTORNEY

United States Patent Office 3,038,320
Patented June 12, 1962

3,038,320
ABSORPTION REFRIGERATION SYSTEM
Richard A. English and Richard H. Merrick, Tyler, Tex., assignors to Carrier Corporation, Syracuse, N.Y., a corporation of Delaware
Filed July 7, 1958, Ser. No. 746,834
8 Claims. (Cl. 62—488)

This invention relates broadly to absorpition refrigeration systems. More particularly this invention relates to the transfer of a solution of refrigerant and absorbent from the low pressure side of an absorption refrigeration system to the high pressure side of the system for transmittal to the generator of the system.

In absorption refrigeration systems of the kind contemplated a solution of refrigerant and an absorbent is circulated through a portion of the system known as the solution circuit. The concentration of the solution varies in different portions of the solution circuit. For example, solution flowing in that part of the circuit leaving the generator is relatively deficient in refrigerant so that it possesses what are termed good absorbing characteristics and is thus referred to as strong solution. The solution flowing in that part of the circuit transmitting solution from the absorber is relatively rich in refrigerant and thus has weak absorbing characteristics and so is termed weak solution. A portion of the refrigerant in solution in the generator is released for flow to the condenser, where it is liquified, and then to the evaporator where it is vaporized and absorbed by the solution flowing in the absorber. After it has been absorbed it flows in the solution circuit to the generator where the process is repeated.

This invention is concerned with an arrangement for transferring solution from the absorber to the generator of the system without the use of pumps or mechanical equipment using seals or other expensive operating equipment. The chief object of the invention is the provision of an improved solution transfer means wherein a solution transfer vessel is arranged so as to be alternately equalized to system high side and low side pressure. The vessel is arranged relative to the components of the system so that the vessel is filled with weak solution when equalized to low side pressure and emptied of weak solution when equalized to high side pressure.

Another object of the invention is a solution transfer arrangement of the kind described wherein the vessel is equalized to the high and low sides of the system through electrically controlled valves operative in a prescribed manner to alternately fill and empty the vessel in a continuous manner.

A further object of the invention is to provide a solution transfer means wherein the control circuitry for the electrically operated valves is arranged so that a delay in the operation of the valves, sufficient to permit seating of valve members controlling flow in the lines leading to and extending from the vessel, occurs at the completion of both the vessel filling and vessel emptying cycles.

A still further feature of the invention involves the provision of a solution collection means, in communication with the high pressure side of the refrigeration system, for receiving weak solution from a solution transfer unit of the kind under consideration for supply to the generator of the system.

Other objects and features of the invention will be apparent upon a consideration of the ensuing specification and drawings in which.

Figure 1:
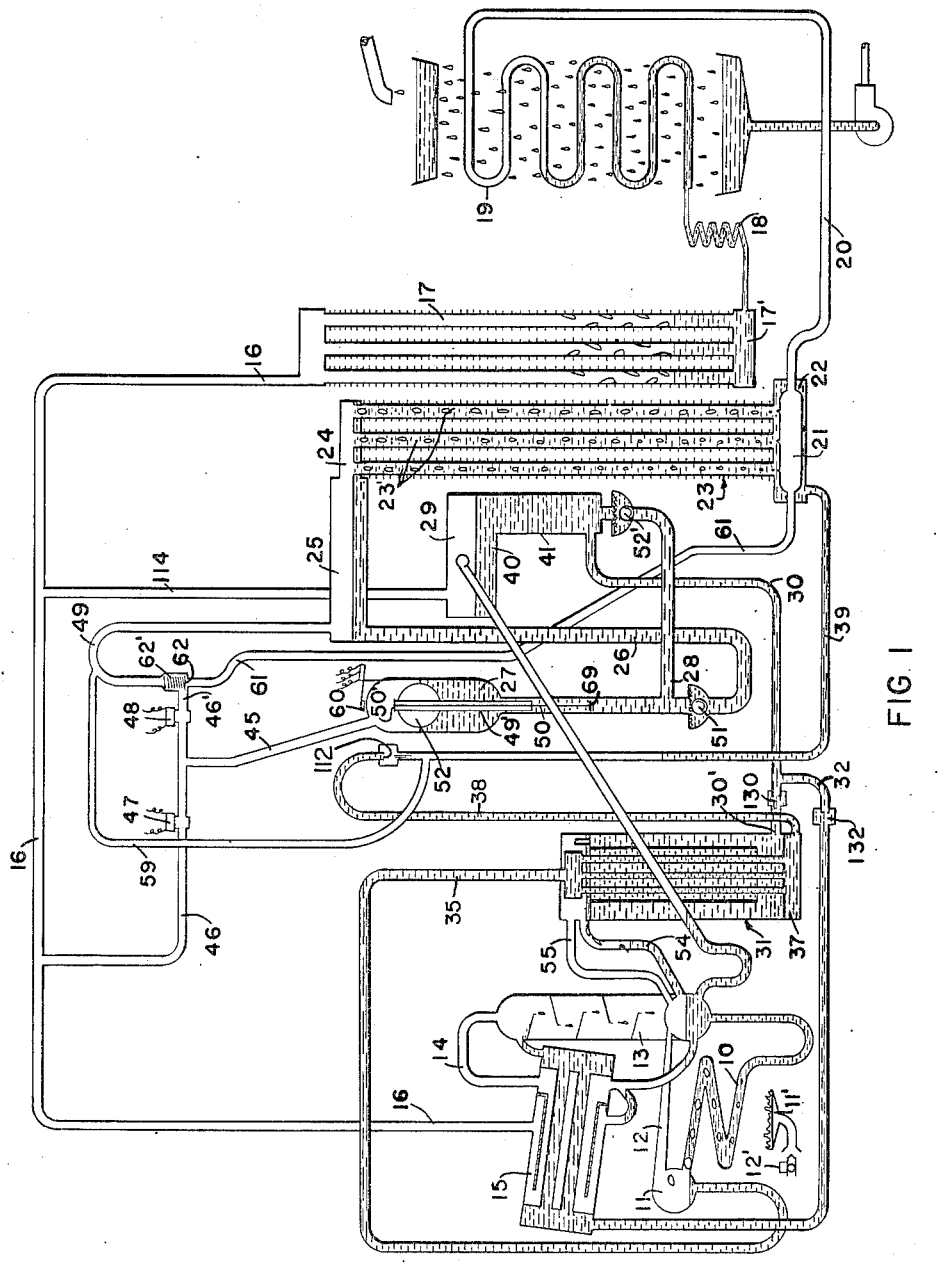
FIGURE 1 is a diagrammatic representation of the invention.

For the purpose of describing this invention, an absorption refrigeration system of the type illustrating this invention is diagrammatically shown in FIGURE 1.

The system illustrated utilizes a solution of ammonia and water, with ammonia acting as a refrigerant, and operates with both the high side and the low side above atmospheric pressure.

The absorption refrigeration system illustrated includes the usual solution circuit wherein a solution of water and ammonia flows between the generator and absorber. The system is arranged so that means are provided for assuring a pressure differential between the high side of the system, embodying the condenser and generator, and the low side of the system including the evaporator and absorber.

Heat is applied to the generator 10 through a gas burner 11' having communication with a fuel supply line controlled by a valve 12' movable between open and closed positions. A solution of ammonia and water is heated in the generator to a temperature sufficient to cause portions of the mixture to boil off or evaporate. The solution in the generator is propelled by a vapor lift action into a chamber 11. In the chamber the gaseous portion of the mixture flows through line 12 to analyzer 13 while the liquid portion of the mixture, being weak in refrigerant but having strong absorbing qualities or characteristics so as to be considered strong solution, flows into the solution circuit which will be described later.

In the analyzer there is located a lower portion which collects solution from the solution circuit for transmittal to the generator 10 and an upper tower portion wherein heat transfer takes place between the vaporous mixture created in the generator and a portion of the solution flowing in the solution circuit. The liquid solution flowing in the analyzer 13 and the gaseous mixture are in interfacial contact as is conventional in analyzers of the type employed in absorption refrigeration systems.

The heat transfer action occurring in the analyzer causes portions of the water vapor in the gaseous mixture flowing in the analyzer to condense and flow to the lower portion of the analyzer for transmittal to the generator. This renders the remaining gaseous mixture richer in ammonia or refrigerant. The gaseous mixture flows through line 14 to the rectifier 15. In the rectifier the gaseous mixture, relatively rich in ammonia is once again placed in heat transfer relation with solution flowing in the solution circuit. The heat transfer action occurring in the rectifier renders the gaseous portion of the mixture purer in refrigerant as additional water vapor condenses out. The ammonia vapor is now free to flow in the line 16 and is substantially free of water vapor. The ammonia vapor flows to the condenser 17 and is condensed as it flows through tubes to a lower header 17'. This action occurs as air from the ambient is directed over the surface of the condenser. The liquid ammonia then flows through a capillary 18 or other restrictor into the evaporator 19. In the evaporator 19 the liquid ammonia is converted to the vapor state as heat flowing from a source of water delivered over the coil raises the temperature of the liquid refrigerant in the evaporator above its boiling point under the pressure conditions existing within the evaporator. The refrigerant emerging from the evaporator 19 flows through the line 20 to a manifold 21 located in a lower header 22 of absorber 23. The vaporous ammonia bubbles up through a series of openings in manifold 21 which are in alignment with the lower ends of vertical tubes 23' having strong solution disposed therein from the solution circuit. The desired absorption action takes place within the absorber with the heat of absorption of the vaporous amomnia being carried away by air propelled by a fan, not shown. Thus the solution carried to the upper header 24 at the top of the absorber 23 is relatively strong in ammonia but has weak absorbing characteristics. Therefore, it is considered as weak solution. Weak solution overflows from upper manifold 24 into low side reservoir 25.

Transfer of weak solution from low side reservoir 25 to the generator which is in the high side of the system is accomplished through a solution transfer vessel which automatically transmits, in a continuous operation, weak solution from the top of the absorber to the generator through a portion of the solution circuit including a heat exchanger or rectifier and the lower portion of the analyzer 13. The weak solution existing at the top of the absorber flows into a reservoir 25 in communication with the top header 24 of the absorber 23, as mentioned above. Within the reservoir 25 there is a quantity of weak solution and also a quantity of vapor, representing refrigerant which may not have been absorbed in the absorber. The weak solution in reservoir 25 flows by gravity down through leg 26 and upwardly past a check valve 51 into a solution transfer vessel 27 when the pressure in the vessel is equalized with the low side pressure in the reservoir 25. Located within the vessel 27 is a float member 52 which rises with the level of the solution flowing into the vessel from the ascending leg of the pipe 26. The top of the solution transfer vessel is provided with an opening in communication with a pipe 45 having branches 46 and 46' in communication with the high pressure side and low pressure side of the system respectively. Flow of gaseous fluid through branches 46 and 46' for the purpose of equalizing pressure in the vessel with the high and low pressure sides of the system respectively is controlled by solenoid valves 47 and 48. The solution transfer vessel 27 is placed in communication with the high pressure side of the system by closing solenoid valve 48 and opening solenoid valve 47 so that pressure in line 16, line 114, and high side reservoir 29 is equalized with the vessel. Communication between the interior of the solution transfer vessel 27 and the low side of the system is accomplished by closing solenoid valve 47 and opening solenoid valve 48. In this manner, line 49 permits communication between the top of low side reservoir 25 and the vessel through lines 46' and 45.

The system operates automatically so as to alternately place the interior of the solution transfer vessel in communication with either the high side or low side of the system, thus alternately equalizing the vessel with high side or low side pressure. When the interior of the solution transfer vessel 27 is in communication with the low side of the system, the difference in the elevation between the header or reservoir 25 and the solution transfer vessel 27 permits solution which has accumulated in the reservoir 25 to flow by gravity through the pipe 26 past ball check valve 51 into the solution transfer vessel 27. As the float within the transfer vessel rises, it carries with it a switch actuating element 50, extending through the float and an extension 49' of the float so that relative movement between the float and element 50 is possible. The switch actuating element has a head portion 50' thereof which contains a magnetic material so that as it approaches the top of the solution transfer vessel it attracts a magnetic arm of a lever 60 having at the other arm thereof a capsule containing mercury. The magnetic attraction causes the lever to move in a counter-clockwise direction which in turn causes the mercury to flow downwardly to a portion of the capsule where it makes contact between two of the three wires or conductors 71, 72, and 73, note FIGURE 2, in the capsule which are a part of the control mechanism for operating the solution transfer vessel.

As pointed out above valves 47 and 48 are employed to control equalization of pressure between the interior of vessel 27 with the high and low pressure sides of the refrigeration system. The ball type check valves however must preferably be seated prior to the change of pressure in the vessel to avoid unnecessary wear occasioned when the valves 51 and 52' are abruptly seated by the relatively instantaneous pressure change.

Figure 2:
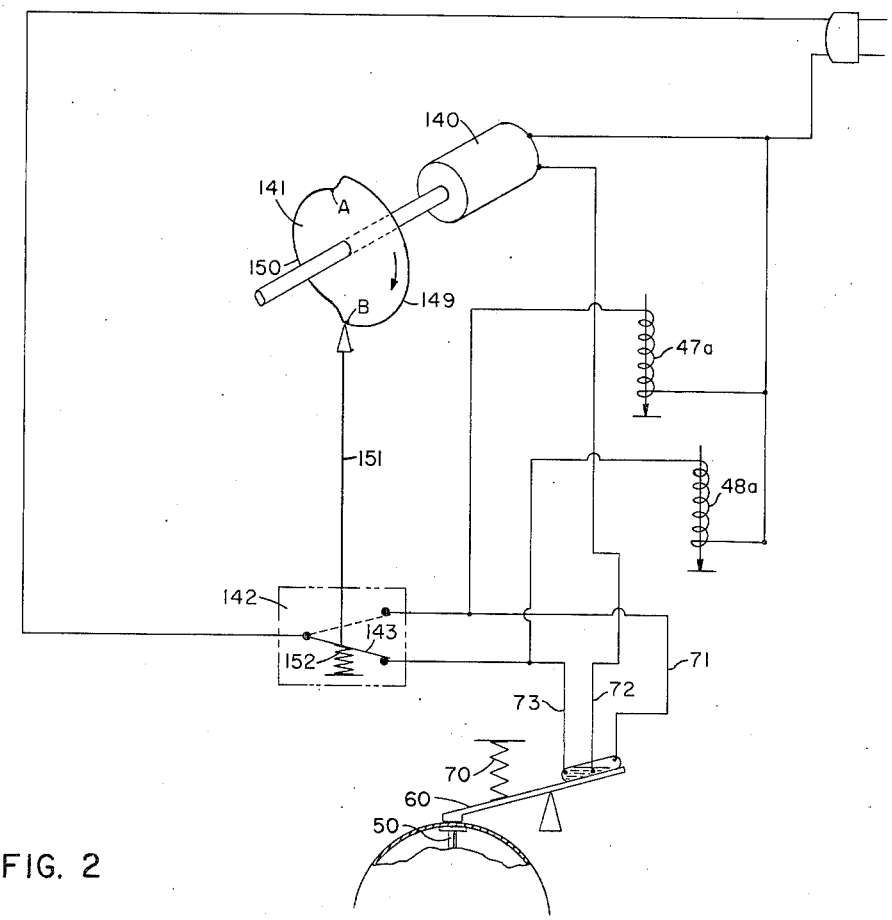
FIGURE 2 is a schematic view of the circuit controlling operation of the valves regulating vessel pressure equalization.

To illustrate the operation of the control mechanism regulating operation of the valves 47 and 48 attention is directed to FIGURE 2 which illustrates the position of the operating elements after the vessel has been filled and the float 52, together with the switch actuating member 50, are at their uppermost position.

While the solution was flowing into the vessel, valve 48 was open and the pressure within the vessel equalized with the low pressure side of the system. Thus a circuit was completed through the coil 48a of valve 48 and the lower contact of cycle switch 142. The spring loaded armature 143 of the cycle switch assumes the position shown through engagement of its follower arm 151 with the surface 149 of cam 141.

As pointed out above the switch actuating rod 50 magnetically attracts one end of the lever 60 causing it to rotate counter-clockwise against the action of spring 70 and assume the position illustrated in FIGURE 2. The bulb containing mercury mounted on the other end of lever 60 is tipped so that the mercury causes a circuit to be made between conductors 72 and 73. Connected in series in this circuit is motor 140 which has mounted on its operating shaft cam 141.

Rotation of the cam under the influence of the motor power shaft is clockwise so that the armature 143 of switch remains in the position shown for a period of time as surface 149 of cam 141 engages the armature follower 151. Thus the circuit through the coil 48a remains closed and the ball valve 51 has an opportunity to seat itself before equalization of the pressure between the vessel and high pressure side of the system occurs. Eventual engagement of the surface 150 of cam 141 with the armature follower 151 permits spring to exert a force on the armature sufficient to move the latter from its lower contact to the upper contact. This completes a circuit through coil 47a, opening valve 47 and interrupts the circuit through coil 48a closing valve 48, and interrupts a circuit through the motor 140.

Opening of valve 47 and the closing of valve 48 equalizes the pressure within the vessel with the high pressure side of the refrigeration system. Flow of solution by gravity from the vessel 27 to the high side reservoir 29 occurs through line 28 past ball check valve 52'. The cycle switch armature 143 is in the dotted line position shown in FIGURE 2 as the follower 151 is in engagement with cam surface 150 at point A. The magnetic attraction between lever 60 and switch actuating rod 50 maintains the parts in the position shown in FIGURE 2 as the float descends within the vessel 27 as the solution level drops. This is accomplished by the sliding fit between float 52 and switch actuating rod 50 which permits relative motion therebetween.

As the float approaches the bottom of the vessel the lower portion 49' of float 52 engages end portion 69, FIGURE 1, of the switch actuating rod 50 and exerts a downward force on the rod sufficient to overcome the magnetic attraction between lever 60 and member 50. Under these circumstances the lever 60 rotates clockwise under the influence of spring 70. The mercury containing bulb carries at the opposite end of the lever tilts, causing the mercury to break the connection between conductors 72 and 73 and establish a circuit between conductors 71 and 72, motor 140 and armature 143, dotted line position, of switch 142. Energization of motor 140 causes cam 141 to rotate clockwise to bring point B on the cam into engagement with armature follower 151. During movement of the cam in the manner described, ball check valve 52' has an opportunity to seat itself so that solution that has drained into the high side reservoir 29 may flow into line 30 as the vessel is supplied with additional solution from low side reservoir 25.

When surface 149 engages the follower 151 in the manner illustrated, the armature is depressed against the action of spring 152 causing the cycle switch to index so that the armature engages the lower contact. Thus the circuit through motor 140 is interrupted as is the circuit through coil 47a controlling valve 47, causing the valve to close. At the same time, a circuit through coil 48a controlling valve 48 is established. The interior of the vessel is placed in communication with the low pressure side of the refrigeration system and the solution which has collected in the low side reservoir drains by gravity into the vessel causing the float 52 to rise within the vessel, carrying rod 50 with it as it engages the upper portion 50'.

As the float approaches the top of the vessel the magnetic attraction described above occurs, causing counterclockwise rotation of the lever 60. Once again conductors 72 and 73 are connected in the manner illustrated in FIGURE 2, and a circuit through the motor 140 is once again established.

The action described continues during operation of the system to provide a continuous flow of weak solution from the absorber to the generator.

High pressure gas trapped in the vessel at the conclusion of the solution expulsion cycle exerts a force upon the under side of plate 62 covering blow down line 61 sufficient to lift the plate against the action of the spring 62'. The trapped high pressure gas then is expanded to low side pressure and absorbed in the absorber as it flows through manifold 21.

Another feature of the invention involves the construction of the high side reservoir 29 arranged to receive solution flowing from the transfer vessel 27. It is well known among those skilled in the art that efficient use of the solution heat transfer unit will assure greater operating efficiency in the system. With the construction shown the relatively cool weak solution flowing from the vessel 27 is subject to warm high pressure gaseous refrigerant flowing in line 114. A certain amount of the high pressure vapor will be absorbed by the cool liquid solution in the reservoir. To maintain this amount at a minimum and prevent the entire body of solution from rising in temperature while preserving the static head in the reservoir for assuring adequate gravity flow of solution to the generator through lines 30, 32, the reservoir is formed to a greater capacity than the vessel 27, and includes an upper portion 40 having substantial width when compared to its depth and a lower portion 41 having substantial depth compared to its width. The upper portion is arranged so that a relatively large liquid surface is presented to the flow of gas in line 114. The absorption action, with the accompanying creation of heat of absorption, that occurs causes the temperature gradient in the solution to be limited in depth in the upper portion. The liquid in portion 41 remains relatively cool and of a depth sufficient to maintain a desirable static head. Thus the thin layer at the top of the body of liquid acts as an insulator for the portion of the solution in the section 41.

Slugs of cool solution enter the reservoir 29 through line 28 and leave through line 30 so that the top warm layer becomes stagnant or placid. The top layer thus adjusts its concentration with respect to the high side pressure.

From the line 30 the flow of weak solution is split between lines 30' and 32.

Considering that portion of the flow of the weak solution through line 32 it will be observed that this line terminates in rectifier 15 so that the relatively cool weak solution flowing in line 32 is placed in heat transfer relation with the gaseous mixture flowing from the analyzer 13 through the rectifier 15, as described above. From the rectifier 13 the weak solution flows then through the analyzer to perform the function described above. By absorbing the heat of condensation of the water in the analyzer and in the rectifier the weak solution has been preheated as it collects in the lower portion of the analyzer 13.

Considering now the flow of weak solution from line 30 through line 30' into the heat exchanger 31, it will be observed that solution heat exchanger 31 is so arranged that an exchange of heat occurs between the weak solution flowing into the liquid heat exchanger from line 30' and relatively warm strong solution flowing into the exchanger from line 35. After the weak solution flows through the solution heat exchanger it is transmitted to the lower portion of the analyzer through line 54. In the event that portions of the weak solution flowing through the solution heat exchanger vaporize, line 55 is provided to connect the top of the solution heat exchanger with the analyzer and thus afford a path for the vapor. In this manner vaporized portions of the weak solution flow into the analyzer and then on into the rectifier in the manner described above.

Considering the flow of strong solution from the generator 10 through line 35 it will be observed that the strong solution gives up a portion of its heat to the weak solution in the heat exchanger in a manner described above. From the lower header 37 of the solution heat exchanger 31 the strong solution flows in line 38 and in line 39 to the lower header 22 of the absorber 23. In the interests of recirculating that portion of the vaporous ammonia which is unabsorbed in the absorber 23 a line 59 is provided with a connection to the line 49 which in turn is connected to the upper or vapor collecting portion of the reservoir 25. The action of the solution flowing in line 39 is to induce the flow of the gaseous unabsorbed refrigerant into the line 39. This particular arrangement is not a part of this invention but is the subject of a patent application, Serial No. 746,776, filed July 7, 1958 in the name of Joseph R. Bourne, and assigned to the assignee of this invention.

The refrigeration system described may be usefully employed in an air conditioning plant wherein the refrigeration system is operative to chill water for supply to a coil located within the enclosure to be supplied with conditioned air. As indicated diagrammatically in FIGURE 1, a source of water under the influence of a pump is circulated through a circuit including a coil as above mentioned and a pan or the like for the purpose of distributing water over the evaporator coil 19 of the refrigeration system. The water flowing over the coil has absorbed heat from the enclosure being supplied with conditioned air, which it rejects to the refrigerant flowing inside the evaporator 19.

Considering the operation of the aborsption refrigeration system as it is embodied in such a plant, it will be obvious that a thermostatically actuated control may be employed to energize the burner 11' when the air in the enclosure being supplied with conditioned air reaches a certain predetermined high temperature. At the beginning of the season start-up period the pressure throughout the machine will have been equalized. The parts are so arranged that a solution of water and ammonia is available in the generator so that upon energization of the burner the vapor producing action described above occurs. This has the effect of building up pressure within the high side of the system as well as pressure in the low side of the system. For the purpose of maintaining the desired pressure differential in the machine, capillary 18, orifice 112 and check valves 51, 52 are provided. Orifices 130, 132 serve to control the level of solution downstream by preventing a surge type flow.

Safety devices such as high temperature or high pressure relief valves may be located on the high side of the system for the purpose of terminating flow of gas to the burner in the event pressure builds up above a predetermined level in the machine. As indicated above the vaporous mixture produced in the generator flows through the analyzer and rectifier where it is passed in heat exchange relation with the solution flowing from the low side of the system.

Relatively pure vaporous refrigerant flows from line 16 into the condenser 17. As indicated above a fan, not shown, may be employed for the purpose of providing a stream of ambient air over the condenser. This action has the effect of liquefying the vaporous ammonia refrigerant in the condenser. As further indicated above the liquid refrigerant flows through the capillary 18 to evaporator 19 where it is converted to the vapor phase. From the evaporator the vaporous refrigerant flows through line 20, header 21, absorber 23 to the low side reservoir 25.

The system then is automatically operable to transfer solution from the low side reservoir 25 to the high side reservoir 29, which it will be noted has a line 114 in communication with the line 16 of the high side of the system.

Movement of strong solution through line 35 is achieved by virtue of the pressure rise due to the operation of the generator. Thus solution flowing through line 35, heat exchanger 31, line 39 and absorber 23 is in a position to absorb vaporous refrigerant from the evaporator during the initial start-up. The strong solution flowing through the absorber will absorb a sufficient quantity of the vaporous refrigerant flowing through line 20 to cause a vapor pressure in the evaporator sufficient to meet the design conditions indicated above once refrigerant rates have been established. However, as the solution continues to flow through the absorber, the absorption action becomes more complete, causing a corresponding drop in pressure in the evaporator 19 to an extent that approaches the design conditions, described above. Eventually equilibrium is attained.

While we have described preferred embodiments of the invention, it will be understood the invention is not limited thereto since it may be otherwise embodied within the scope of the following claims.

We claim:

1. In an absorption refrigeration system of the two pressure type wherein a solution of refrigerant and an absorbent circulate, a generator disposed in the high pressure side of the system, an absorber located in the low pressure side, means forming a circuit for the flow of strong solution from the generator to the absorber and the flow, from the absorber to the generator, of weak solution, a solution transfer vessel interposed in said circuit, and means for alternately equalizing pressure in the vessel with the high pressure side and the low pressure side of the system to continuously fill and empty the vessel, said last mentioned means including electrically operated valve means controlling communication between the vessel and the high and low pressure sides of the system, a control circuit for operating said valve means, a switch in said circuit, and a float valve actuated switch influencing operation of said first switch.

2. The invention set forth in claim 1, including a first line forming a connection between the low pressure side of the system and the vessel, a second line connecting the first line and the absorber and valve means controlling communication between said two lines, said valve means being operative in the presence of high side pressure to establish communication between said first and second lines to provide a path for the flow of high pressure fluid trapped in vessel to the absorber.

3. The invention set forth in claim 1, wherein said electrically operated valve means includes a first solenoid controlling communication between the high pressure side of the system and the vessel and a second solenoid controlling communication between the low pressure side of the system and the vessel and said valve actuating means includes electrical circuit means actuating the valves so that cycling of the valves is delayed for a predetermined period prior to equalization of pressure of the vessel with either side of the system.

4. The invention set forth in claim 1, including a first reservoir for receiving weak solution from said absorber, a line connecting said reservoir with said vessel, a check valve in said line arranged to permit flow of solution to the vessel and prevent flow from the vessel upstream of said valve, wherein said valve actuating means is operative to delay equalization of high side pressure with the vessel until said check valve is positioned to prevent said upstream flow.

5. In an absorption refrigerating system of the two pressure type wherein a solution of refrigerant and an absorbent circulates therein, an evaporator, an absorber, a generator and a condenser, means forming a circuit for the flow of solution between said generator and said absorber whereby solution possessing strong absorbing characteristics flows from the generator to the absorber and solution possessing weak absorbing characteristics flows from the absorber to the generator, a first reservoir communicating with said absorber, a second reservoir communicating with said generator, means for transmitting solution from the absorber to the generator, said solution transmission means including a solution transfer vessel located in spaced relation to said reservoirs, a line connecting said first reservoir with the transfer vessel, a valve controlling direction of flow of solution is said line, a branch line connecting the first line with the second reservoir, a valve controlling direction of flow in said branch line, means for alternatively connecting the interior of said solution transfer vessel with the high pressure side of the system and the low pressure side of the system whereby flow of solution from said first reservoir to said solution transfer vessel occurs by gravity when the vessel is subjected to the low pressure side of the system and flow of solution from the vessel to the second reservoir occurs by gravity when the interior of the vessel is subjected to the pressure of the high side of the system, said last mentioned means including a line having a branch connected to the high pressure side of the system and a branch connected to the low pressure side of the system, a solenoid valve in each branch, electrical circuits controlling operation of said solenoid valves, switch means including a lever having a first end portion of magnetic material and a second contact-carrying end portion, a switch actuating element having a magnetic head disposed in said liquid transfer vessel, a float for elevating said element to a position where the magnetic field of the element head attracts the magnetized lever end portion to actuate the switch and energize the solenoids to place the interior of the vessel in communication with the high side of the system so that solution in the vessel flows by gravity into the second reservoir.

6. In an absorption refrigeration system the combination including a generator, a condenser, an evaporator, an absorber, means operable to circulate a solution of refrigerant and absorbent in a solution circuit including the generator and the absorber, said means including a solution transfer vessel for collecting solution when the vessel is equalized with pressure in the low side of the system and to expel solution for flow to the generator when the vessel is equalized with pressure in the high side of the refrigeration system, means for controlling equalization of the pressure in the system with the vessel comprising electrically operated valves, a control circuit including a cam actuated switch regulating operation of the valves, and means operable in response to the level of solution within the vessel for regulating the cam actuated switch.

7. In an absorption refrigeration system the combination including a generator, a condenser, an evaporator, an absorber, means forming a path for the flow of a solution of absorbent and refrigerant from the generator to the absorber, means for transmitting solution from the absorber to the generator, said last means including a solution transfer vessel, valve means for alternately equalizing pressure within the vessel with the low pressure and high pressure sides of the system to alternately fill and drain said vessel, and valve actuating means including an electrical circuit operable in response to the level of solution in said vessel, said circuit being effective to regulate operation of the valves to introduce a time delay between operation of the valves at the conclusion of the filling and draining cycles.

8. In an absorption refrigeration system including a generator and a condenser in the high pressure side thereof, an evaporator and an absorber in the low pressure side thereof and means forming a circuit for the flow of a solution of refrigerant and absorbent from the absorber to the generator, a solution transfer vessel for alternately receiving solution from said absorber when subject to system low side pressure and expelling said solution when subject to system high side pressure and solution collection means receiving said solution from said transfer vessel for flow by gravity to said generator, said solution collection means having an upper section in communication with said high pressure side of said system downstream of said generator and a lower section in communication with said generator, said upper section being constructed such that release of solution from said solution collection means affects the solution level in the upper section only and provides a constant liquid head on the solution leaving the solution collection means from the lower section.

References Cited in the file of this patent
UNITED STATES PATENTS

| | | |
|---|---|---|
| 2,146,077 | Kuenzli | Feb. 7, 1934 |
| 2,207,260 | Kuenzli | July 9, 1940 |
| 2,339,815 | Roth | Jan. 25, 1944 |
| 2,552,071 | Terrill | May 8, 1951 |
| 2,653,454 | Buchel | Sept. 29, 1953 |
| 2,929,222 | Lang | Mar. 22, 1960 |
| 2,930,204 | Lang | Mar. 29, 1960 |

UNITED STATES PATENT OFFICE
CERTIFICATE OF CORRECTION

Patent No. 3,038,320 June 12, 1962

Richard A. English et al.

It is hereby certified that error appears in the above numbered patent requiring correction and that the said Letters Patent should read as corrected below.

Column 1, line 9, for "absorpition" read -- absorption --; column 5, line 14, for "veseel" read -- vessel --; column 6, line 50, for "aborsption" read -- absorption --; column 7, lines 28 and 29, after "refrigerant" insert -- flow --.

Signed and sealed this 2nd day of October 1962.

(SEAL)
Attest:

ERNEST W. SWIDER
Attesting Officer

DAVID L. LADD
Commissioner of Patents